United States Patent [19]
Yamada et al.

[11] Patent Number: 6,116,170
[45] Date of Patent: Sep. 12, 2000

[54] WASTE INCINERATOR

[75] Inventors: Yasuhiro Yamada, Osaka; Masuo Takeda, Fukuoka, both of Japan

[73] Assignee: Innovative Environmental Technology Co., Ltd., Fukuika, Japan

[21] Appl. No.: 09/289,703

[22] Filed: Apr. 14, 1999

[30] Foreign Application Priority Data

Apr. 16, 1998 [JP] Japan .................................. 10-106450
Jun. 11, 1998 [JP] Japan .................................. 10-163592

[51] Int. Cl.[7] .............................. F23G 5/10; C03B 3/00; C03B 5/16
[52] U.S. Cl. ...................... 110/233; 110/206; 110/250; 65/335; 65/134.8
[58] Field of Search ................................ 110/233, 203, 110/204, 205, 206, 208, 210, 211, 215, 225, 250; 266/75; 65/335, 347, 134.8; 423/210.5; 588/201, 205, 231, 248

[56] References Cited

U.S. PATENT DOCUMENTS

| | | | |
|---|---|---|---|
| 3,675,600 | 7/1972 | Jones | 110/8 R |
| 3,765,346 | 10/1973 | Stockman | 110/8 R |
| 4,481,891 | 11/1984 | Takeshita et al. | 110/238 |
| 4,574,714 | 3/1986 | Bach et al. | 110/346 |
| 4,794,871 | 1/1989 | Schmidt et al. | 110/341 |
| 5,402,439 | 3/1995 | Bullmann et al. | |
| 5,585,532 | 12/1996 | Nagel | 588/201 |

FOREIGN PATENT DOCUMENTS

| | | |
|---|---|---|
| 0 856 492 | 8/1998 | European Pat. Off. . |
| 195 32 505 | 12/1996 | Germany . |
| 56-12914A | 2/1981 | Japan ............................... 110/208 |

*Primary Examiner*—Denise L. Ferensic
*Assistant Examiner*—Ken Rinehart
*Attorney, Agent, or Firm*—Wenderoth, Lind & Ponack, L.L.P.

[57] ABSTRACT

A waste incinerator is provided which can completely prevent environmental pollution by dioxins. Exhaust gas from an incinerator is guided into a glass melting furnace by a duct, and blown into molten glass through a bubbling pipe to decompose dioxins in the exhaust gas. High-temperature gas produced in the glass melting furnace is supplied into the incinerator by a pipe so as to burn wastes without using auxiliary fuel. Further, exhaust gas is pressurized by pressure pumps in a pipe branching from the duct, while fuel tablets to including ashes are introduced through a fuel inlet and fed into the molten glass under the pressure of exhaust gas to decompose dioxins in the ashes.

11 Claims, 3 Drawing Sheets

WASTE INCINERATOR

BACKGROUND OF THE INVENTION

This invention relates to a waste incinerator especially suitable for preventing environmental pollution by dioxin.

Environmental pollution by dioxin produced when industrial and other wastes burn is becoming one of the biggest social problems in recent years. Dioxine is a general term for virulently poisonous isomers having a molecular structure consisting of two benzene rings bonded together by two oxygen atoms, and chlorine atoms bonded to the benzene rings. Dioxins are produced in large amounts especially when plastics containing chlorine are burned. Dioxins not only pollute the atmosphere, but also the soil and water by falling onto the ground. Waste ashes are also a leading cause of soil pollution because they also contain a large amount of dioxin.

Just recently, it was found out that the higher the burning temperature of wastes, the less they produce dioxins. Thus, the best way to reduce the dioxin content is to burn wastes at as high a temperature as possible. But a high-temperature incinerator tends to be large in scale, and needs a complicated heat-shield structure. Its running cost is high too because heavy oil is used. Further, although such a high-temperature incinerator can reduce the production of dioxins, exhaust gases and ashes produced from such an incinerator still contain a certain amount of dioxins. Therefore, it is impossible to totally prevent environmental pollution by dioxins.

An object of this invention is to provide a waste incinerator which can completely prevent environmental pollution by dioxins.

SUMMARY OF THE INVENTION

According to this invention, there is provided a waste incinerating apparatus comprising an incinerator and a glass or metal melting furnace arranged such that exhaust gas discharged from the incinerator is blown into molten glass or metal in the melting furnace.

The exhaust gas discharged from the incinerator is blown into high-temperature molten glass or metal to decompose poisonous dioxins in the exhaust gas. The high-temperature molten material also decomposes polychlorinated biphenyl contained in the exhaust gas. If the material is molten glass, it is possible to remove carbon dioxide, nitrogen oxides, sulfur oxides, lead, arsenic and other heavy metal oxides, halogens, etc. by melting them into the molten glass.

By bubbling the exhaust gas blown into the molten material from a lower portion of the melting furnace while maintaining the molten material at 850° C. or over, dioxins can be decomposed more completely because dioxins are kept in contact with the high-temperature material efficiently for a long time. The molten material is maintained at a temperature not less than 850° C. because it is known that dioxins can be completely decomposed by maintaining them at a temperature of 850° C. or over for 2 seconds. Glass and most metals have a melting point of 850° C. and over, but if a metal having a melting point lower than 850° C. is used as the molten material, it has to be heated to 850° C. or over.

By providing at least one porous (e.g., mesh), plate in the molten material, it is possible to cut bubbles of exhaust gas blown into the molten material into small pieces. Thus, the dioxins can be brought into contact with the high-temperature material with higher efficiency.

By supplying the high-temperature gas produced in the melting furnace into the incinerator, the combustion efficiency in the incinerator improves. This eliminates the need for auxiliary fuel, and makes it possible to use thermal energy efficiently.

By pressurizing the exhaust gas discharged from the incinerator, and providing a fuel inlet at an intermediate portion of a pipe through which the pressurized exhaust is guided into the molten material in the melting furnace, it is possible to supply fuel through the fuel inlet into the molten material using the pressure of the pressurized exhaust gas to use the fuel as a heat source for the melting furnace.

Fuel supplied through the fuel inlet may be formed by solidifying waste plastic or a mix of waste plastic and pulverized glass, waste ashes or polluted soil to use the waste plastic as a heat source for the melting furnace and to decompose dioxins produced from the waste plastic.

By adding waste ashes and polluted soil to the waste plastic, it is possible to treat these flame-retardant wastes in the high-temperature molten material. By adding waste ashes discharged from the incinerator, it is possible to decompose dioxins contained in the ashes. By adding glass powder to the waste plastic, it is possible to eliminate the need to replenish glass material into the glass melting furnace.

Other features and objects of the present invention will become apparent from the following description made with reference to the accompanying drawings, in which:

DETAILED DESCRIPTION OF THE PREFERRED EMBODIMENT

Figure 1:
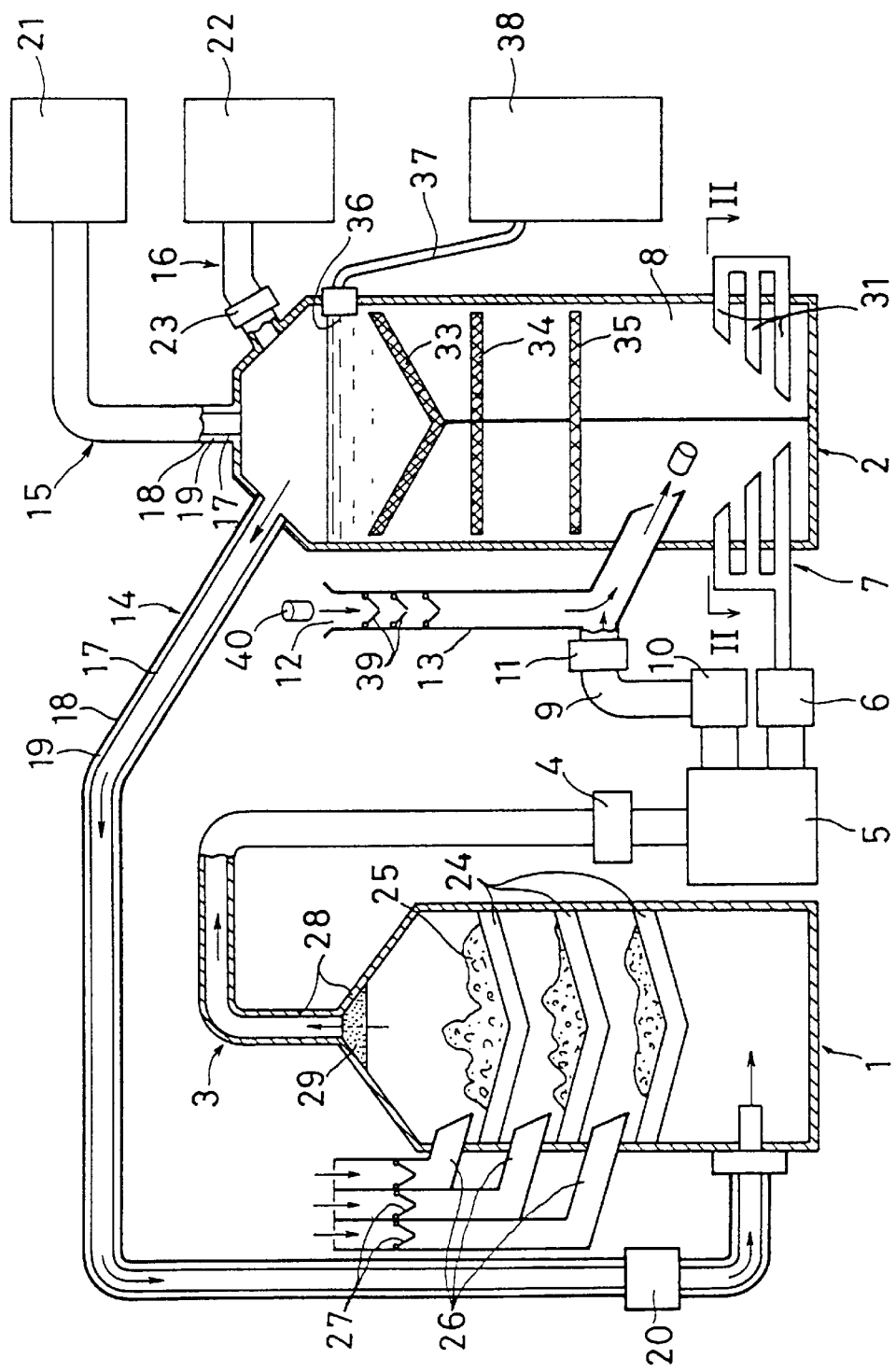
FIG. 1 is a schematic view showing a waste incinerating apparatus embodying the present invention.
Figure 2:
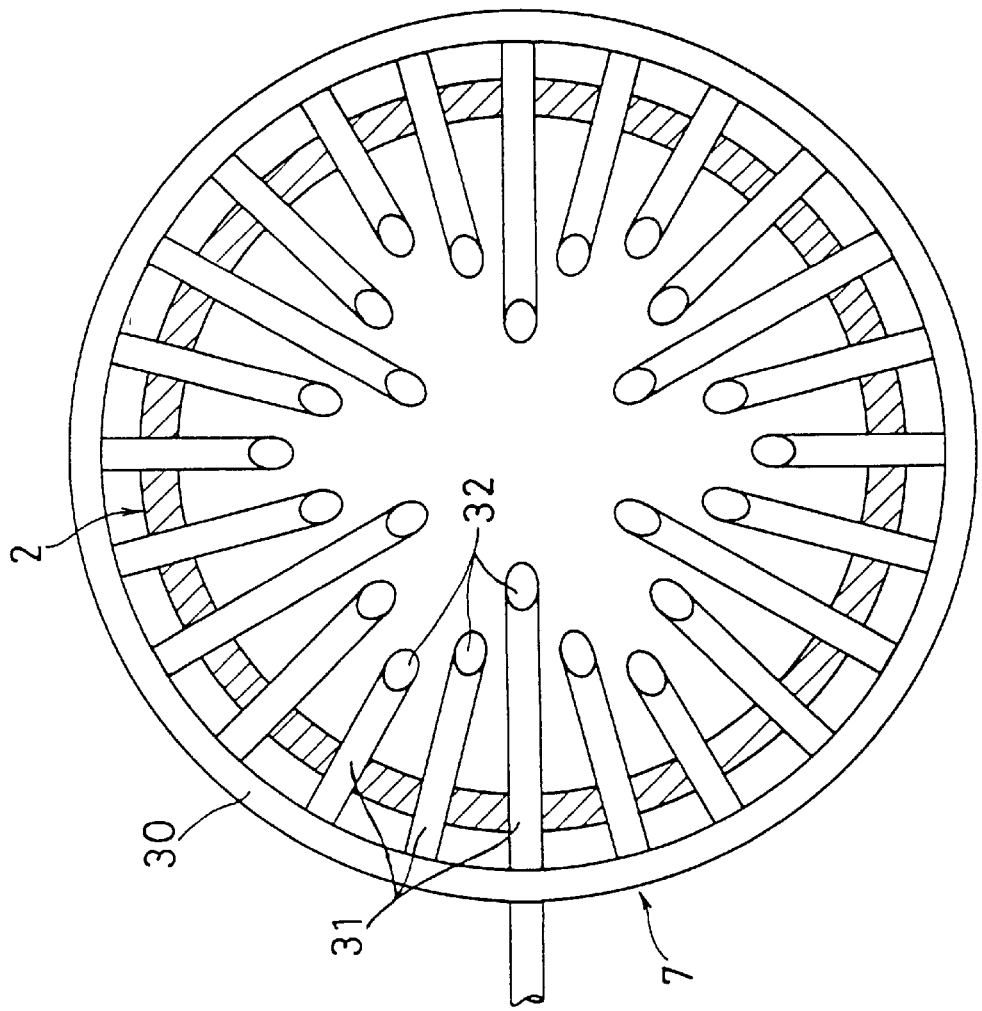
FIG. 2 is a sectional view along line II—II of FIG. 1.
Figure 3:
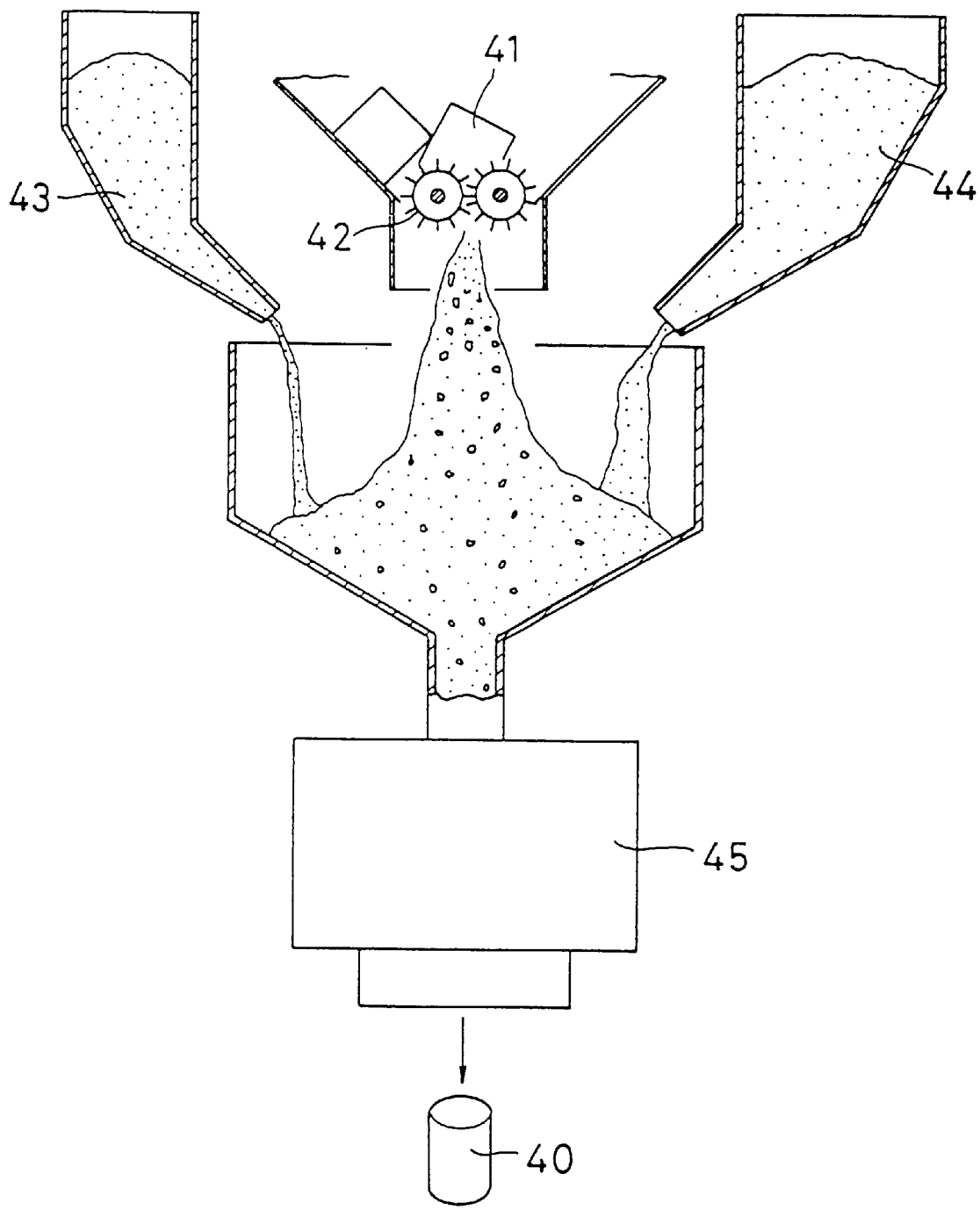
FIG. 3 is a schematic view showing how fuel tablets are formed.

Now referring to FIGS. 1 through 3, an embodiment of this invention is described. The waste incinerating apparatus of the embodiment comprises an incinerator 1 and a glass melting furnace 2. Exhaust gas of the incinerator 1 is guided by a duct 3 through a pressure pump 4 into an exhaust gas adjusting tank 5. It is then further pressurized by a pressure pump 6 and blown to the bottom of molten glass 8 in the glass melting furnace 2 through a bubbling pipe 7. Another pipe 9 is connected to the exhaust gas adjusting tank 5. Exhaust gas is also pressurized by pressure pumps 10, 11 and introduced into the molten glass 8 through this pipe 9. A pipe 13 extends from an intermediate portion of the pipe 9 to a fuel inlet 12 which is described later.

To the top of the glass melting furnace 2, three pipes 14, 15, 16 are connected. In order to improve heat insulating properties, the pipes 14 and 15 comprise an inner pipe 17 made of molybdenum and an outer pipe 18 with the space 19 between the inner and outer pipes depressurized. The pipe 14 is connected through a pressurizing tank 20 to the lower part of the incinerator 1 to supply hot air into the incinerator. Hot air from the pipe 15 is also supplied to a private power generator 21 and used as a heat source for its steam turbine. The pipe 16 extends to a scrubber 22, where the chlorine gas produced by decomposing dioxins is neutralized. A vacuum pump 23 is provided in the pipe 16 to depressurize the interior of the glass melting furnace 2 so that exhaust gas from the bubbling pipe 7 can be easily introduced into the molten glass 8.

The incinerator 1 has furnace beds 24 in three tiers. Wastes 25 to be burned are fed onto the beds 24 through respective chutes 26. Each chute 26 has at its inlet a check valve 27 made of heat-resistant rubber. The incinerator 1 and the duct 3 have their inner walls lined with heat-resistant bricks 28. A filter 29 is provided at the inlet of the duct 3 to remove dust.

The bubbling pipe 7 connected to the bottom of the glass melting furnace 2 comprises, (see FIG. 2), an annular pipe 30 and a plurality of radial pipes 31 of different lengths connected to the pipe 30 so that exhaust gas outlets 32 are distributed uniformly in a horizontal section of the glass melting furnace 2.

Three porous(i.e., mesh) plates 33, 34, 35 are provided one over another in the molten glass 8. These porous plates serve to cut bubbles of exhaust gas blown in from the bubbling pipe 7 into small pieces. Since bubbles grow as they rise by merging and depressurization, the upper porous plate is finer in (i.e., pore size) than the one immediately thereunder. The uppermost porous plate 33 has a V section so that molten dregs will collect at the ends of the surface of the molten glass 8.

In the hot molten glass 8, polychlorinated biphenyl is decomposed together with dioxins. Also, carbon dioxide, nitrogen oxides, sulfur oxides, lead, arsenic and other heavy metal oxides, halogens, etc. contained in the exhaust gas melt into the molten glass 8 and are removed.

An overflow port 36 is provided at the top of the glass melting furnace 2. A pipe 37 connects the port 36 to a glass sorting device 38. molten glass 8 flowing out through the overflow port 36 is cooled and sorted in the sorting device 38 and used for e.g. craftwork.

In the pipe 13 leading to the fuel inlet 12, check valves 39 made of heat-resistant rubber are provided in three stages. Fuel tablets 40 introduced through the fuel inlet 12 drop through the pipe 13 and are fed into the molten glass 8 by the pressurized exhaust gas.

As shown in FIG. 3, fuel tablets 40 are formed by crushing waste plastic in a crusher 42, adding pulverized glass 43 and ashes 44 to the crushed waste plastic 41, and compressing the mix in a press 45. Pulverized glass 43 is added to supply glass material into the furnace 2, increase the melting point of the tablets 40, and prevent the tablets from melting in the pipe 13. Thus, the tablets 40 can smoothly be fed into the glass melting furnace. Also, pulverized glass 43 serves to neutralize acidic ashes 44 by melting in the glass melting furnace 2.

The ashes 44 may be ashes discharged from the incinerator 1 or existing unprocessed ashes. Fuel tablets 40 are formed by solidifying a mix of different kinds of powders in this embodiment, but may also be formed by solidifying different kinds of powders in layers. For example, each tablet may comprise an inner layer of waste plastic 41 and ashes 44, and an outer layer of pulverized glass 43.

The incinerator of the embodiment described is a glass melting furnace, but a metal melting furnace may be used instead. As a metal melting furnace, a melting furnace for melting scraps or a furnace for treating molten metals such as a converter for steel may be used.

The incinerator is not limited to the type having multiple tiers of beds as in the embodiment, but may also be of any other type. Of course, an incinerator that needs auxiliary fuel may be used. A chimney of an existing incinerator may be modified into a duct to guide exhaust gas into the melting furnace.

As described above, according to this invention, exhaust gas from the incinerator is guided into a glass or metal melting furnace so as to be blown into the hot molten body to decompose virulently poisonous dioxins. It is thus possible to completely prevent environmental pollution by dioxins contained in exhaust gas. This incinerator can also decompose poisonous polychlorinated biphenyl. If a glass melting furnace is used, it is possible to remove carbon dioxide, nitrogen oxides, sulfur oxides, lead, arsenic and other heavy metal oxides, halogens, etc. by melting them into the molten glass.

Since hot gas produced in the melting furnace is supplied into the incinerator, the burning efficiency in the incinerator improves, so that no auxiliary fuel is needed. Thermal energy can thus be efficiently used. Since exhaust gas from the incinerator is pressurized and a fuel inlet is provided in an intermediate portion of the pipe through which the pressurized exhaust gas is guided into the melting furnace, it is possible to supply waste plastic through this inlet to use it as a heat source for the melting furnace. By adding ashes to the waste plastic, it is possible to decompose dioxins in the ashes.

What is claimed is:

1. A waste incinerating apparatus comprising:
   a melting furnace for melting one of a glass material and a metal material and for maintaining a molten material at a temperature of at least 850 degrees Celsius, said melting furnace including at least one porous plate to be submerged within the molten material;
   an incinerator connected to said melting furnace and arranged such that exhaust gas discharged from said incinerator is discharged into a bottom portion of said melting furnace so as to flow through the molten material and pass through said at least one porous plate.

2. The apparatus of claim 1, wherein said melting furnace is connected to said incinerator arranged such that a high-temperature gas generated in said melting furnace is channeled into said incinerator.

3. The apparatus of claim 2, wherein said incinerator includes an exhaust pipe extending from said incinerator to said bottom portion of said melting furnace and an exhaust gas pressurizer in said exhaust pipe, further comprising a fuel inlet at an intermediate portion of said exhaust pipe.

4. The apparatus of claim 3, further comprising fuel supplied into said melting furnace through said fuel inlet, said fuel being formed of solidified waste plastic.

5. The apparatus of claim 4, wherein said fuel further includes at least one of a pulverized glass, ashes, and polluted soil.

6. The apparatus of claim 1, wherein said incinerator includes an exhaust pipe extending from said incinerator to said bottom portion of said melting furnace and an exhaust gas pressurizer in said exhaust pipe, further comprising a fuel inlet at an intermediate portion of said exhaust pipe.

7. The apparatus of claim 6, further comprising fuel supplied into said melting furnace through said fuel inlet, said fuel being formed of solidified waste plastic.

8. The apparatus of claim 7, wherein said fuel further includes at least one of a pulverized glass, ashes, and polluted soil.

9. The apparatus of claim 1, wherein said melting furnace includes at least two porous plates submerged within the molten material, said at least two porous plates being stacked in said melting furnace such that each of said porous plates has a smaller pore size than a porous plate thereunder.

10. The apparatus of claim 9, wherein an uppermost porous plate has a V-shape and is arranged in said melting furnace such that a middle portion of said V-shaped porous plate is lower than an outer edge portion.

11. The apparatus of claim 1, further comprising a bubbling pipe at said bottom portion of said melting furnace, wherein the exhaust gas from said incinerator is discharged into said melting furnace through said bubbling pipe, said bubbling pipe including an annular pipe and a plurality of open radial pipes extending from said annular pipe.

* * * * *